United States Patent [19]

Cummings

[11] Patent Number: 5,046,940
[45] Date of Patent: Sep. 10, 1991

[54] APPARATUS FOR DIVIDING AND CUTTING DOUGH

[75] Inventor: Donald L. Cummings, Mechanicsville, Va.

[73] Assignee: Automated Machinery Systems, Inc., Richmond, Va.

[21] Appl. No.: 501,738

[22] Filed: Mar. 30, 1990

Related U.S. Application Data

[62] Division of Ser. No. 367,618, Jun. 19, 1989, Pat. No. 4,948,611.

[51] Int. Cl.⁵ .............................................. A23P 1/12
[52] U.S. Cl. ................................... 425/239; 425/308; 425/382 R; 425/382.4; 425/311
[58] Field of Search ................ 264/141, 142; 426/503, 426/518, 516; 425/308, 311, 313, 382 R, 132, 382.4, 239

[56] References Cited

U.S. PATENT DOCUMENTS

| 3,776,671 | 12/1973 | Bruschke et al. | 425/313 |
| 3,782,876 | 1/1974 | Groff | 425/311 |
| 3,890,453 | 6/1975 | Harmon et al. | 426/516 |
| 4,332,538 | 6/1982 | Campbell | 264/40.2 |
| 4,442,131 | 4/1984 | Nagy et al. | 425/311 |
| 4,747,767 | 5/1988 | Schnell | 425/311 |
| 4,925,689 | 5/1990 | Getman | 425/311 |

FOREIGN PATENT DOCUMENTS 63-51110  3/1988  Japan ................................. 425/311

Primary Examiner—Jay H. Woo
Assistant Examiner—Robert B. Davis
Attorney, Agent, or Firm—Staas & Halsey

[57] ABSTRACT

An apparatus for dividing a mass of dough into a plurality of individual streams by means of a manifold and fine tuning the flow rate of the individual streams by weir type diaphragm valves so the streams have identical flow rates. Each of the individual streams of dough are simultaneously cut into identical dough pieces by a rotating driver by a four-bar link mechanism.

9 Claims, 3 Drawing Sheets

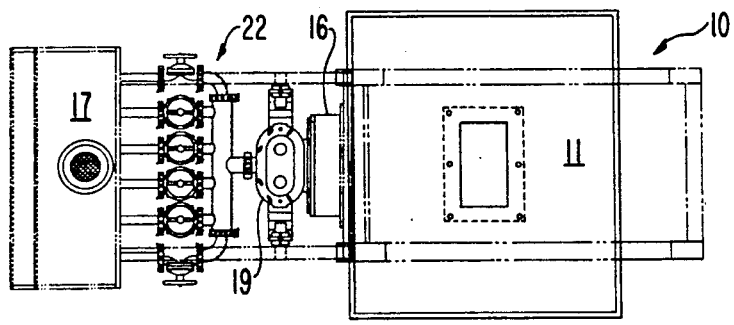
FIG. 1a
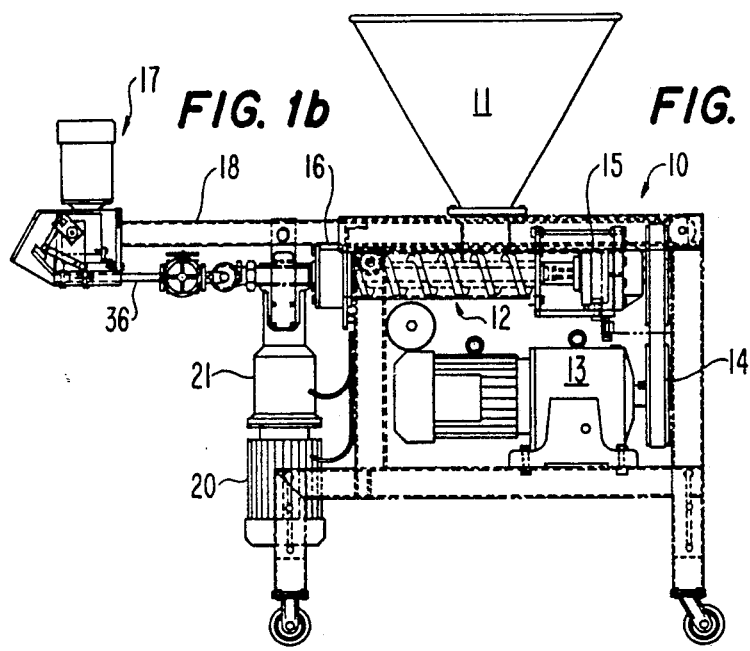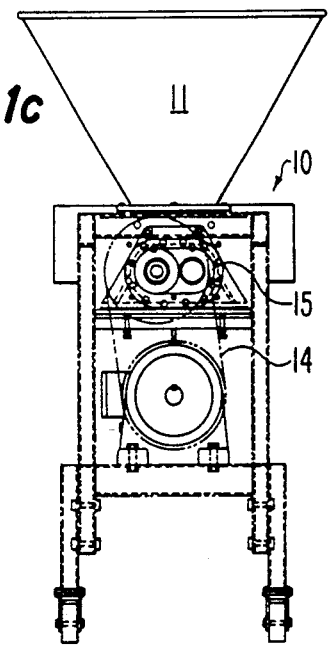
FIG. 1b  FIG. 1c
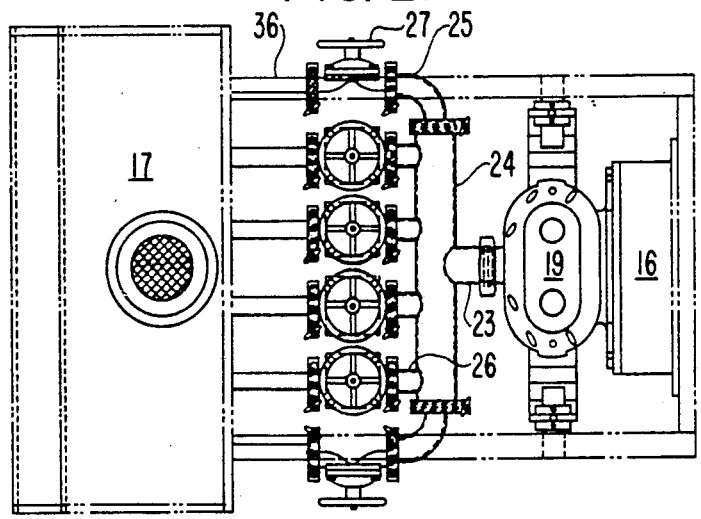
FIG. 2

APPARATUS FOR DIVIDING AND CUTTING DOUGH

This is a division of copending application Ser. No. 07/367,618 filed on June 19, 1989 and now U.S. Pat. No. 4,948,611.

This invention relates to an apparatus and method for dividing a continuous stream of dough and the like into multiple continuous streams which are simultaneously extruded and cut-off by a unique cutting mechanism to provide pieces to be baked into buns, rolls and the like having predetermined weights of uniform density and texture. The apparatus and method may also be used for other materials that are similar to dough and its characteristics.

The invention is an improvement on the apparatus and methods disclosed in U.S. Pat. Nos. 4,332,538, 4,424,236, 4,449,908 and 4,517,212 which are referred to herein and incorporated by reference. These prior patents show a double auger type of dough pump and divider which takes a mass of dough in bulk form and pumps it through in a single extruder or dispensing nozzle where it is cut into uniform pieces by a cutter moving across the dispensing nozzle.

The present improvement utilizes the prior art apparatus by dividing the continuous stream of dough and the like into smaller volumes which are simultaneously cut-off by a knife preset to a constant cut-off rate. A very important criteria for a successful machine and method for producing dough pieces in large quantities is to provide pieces which are uniform in weight for subsequent handling and baking.

The invention also includes a unique cutting mechanism which may also be utilized with single discharge ports.

The invention preferably utilizes the improved apparatus and method for pumping and homogenizing dough as described more fully in U.S. Pat. Application entitled "Apparatus and Method for Pumping, Homogenizing and Dividing Dough and the Like" or Donald L. Cummings, assigned to the same assignee and filed on even date herewith. This other patent application is also an improvement to the four U.S. patents listed above and the patent application is referred to and incorporated by reference herein.

The present invention utilizes a manifold for dividing the continuous stream of dough into multiple streams and the flow rate is fine tuned by a throttling valve so that each of the multiple streams of dough flow at a constant rate to a cut-off section at each of the discharge ports. The valves are preferably the weir type of diaphragm sanitary valves which utilize a polytetrafluoroethylene (TFE) coated diaphragms. These valves control the velocities of the dough to the multiple discharge ports at the cut-off section and provide a relatively straight line adjustment control so that the amount of movement of the valve adjustment means causes a similar relative amount of throttling. The valves used are available from several sources but one of the preferred types of valves are the Saunders weir type diaphragm valves produced by the Saunders Valve, Inc., 15760 West Hardy Road, Houston, TX 77060.

The cut-off mechanism utilizes a plastic cut-off knife mounted on a four-bar link mechanism which is driven by a continuous predetermined constant speed drive shaft which provides a 1) straight line motion; 2) velocity change; 3) path change; and 4) product control as the four-bar link mechanism goes through a complete cycle. The invention is of special value in producing hamburger buns in large quantities as the pieces cut-off are of uniform texture and weight with the tolerances on the weight of the pieces being within $\frac{1}{4}\%$ as opposed to more normal tolerances of $2\frac{1}{4}\%$ variations in weight. Since no lubricating oil is utilized, except for the first run which is wiped off immediately by the first dough passing through the apparatus, the buns can be produced with a uniform color. The tight tolerances of the finished pieces greatly improve the subsequent automatically handling of the pieces for the baking operation and packaging.

BRIEF DESCRIPTION OF THE DRAWINGS

The features of the present invention will become more apparent upon reading the following specification, when taken in conjunction with the accompanying drawings in which:

FIG. 1a is a plan view of the invention assembled with the auger feed;

FIG. 1b is a side view of FIG. 1a;

FIG. 1c is the end view from the right side of FIG. 1b;

FIG. 2 is an enlarged plan view of the left portion of FIG. 1a;

FIG. 3b is a schematic of the cross section of the valve shown in FIG. 3a;

Figure 3A:
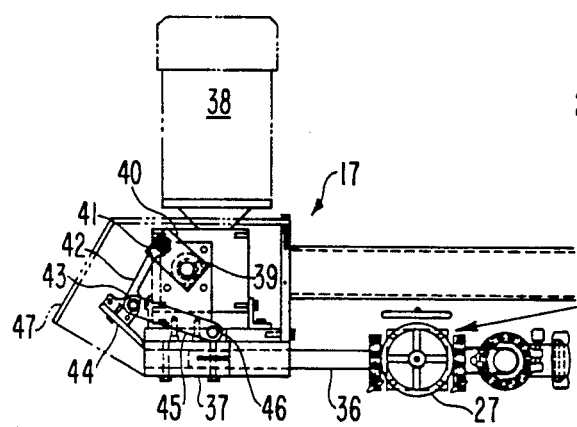
FIG. 3a is an enlarged side view of the left portion of FIG. 1b.

Referring now and more detail to the drawings, there is shown in FIGS. 1a, 1b and 1c, the dough dividing apparatus 10 having a hopper 11 and an auger inside a trough and tunnel 12. The trough is the portion under the hopper outlet and the tunnel is the portion to the left of the trough. Although the drawings show approximately four threads of the flight of the auger in the tunnel, it is preferable to use only slightly more than two threads. The auger is a double juxtaposed pair of augers which are driven by a main drive 13 through a belt drive 14 and drive gear box 15.

The dough is continuously extruded to the left through a transition block 16 to a cut-off knife assembly 17. The apparatus has a support frame 18. The dough is homogenized to a uniform texture and density by the augers in the tunnel prior to the continuous exit of the dough through the transition block 16 to the metering pump 19 which has an outlet conduit. The metering pump is driven by a motor 20 to a gear box 21. The apparatus and method for handling the dough to provide this continuous stream of dough having a uniform texture and density is more fully described in the above-identified patent application filed simultaneously herewith.

With reference to FIGS. 1a, 1b and 2, the continuous stream of dough being transmitted through the outlet conduit of the metering pump 19 is fed into a manifold assembly 22 which divides the dough into six continuous streams of dough. Usually, this is four, six or eight streams and of course, can be a fewer or a larger number of multiple streams. The manifold assembly 22 has an inlet 23, a header 24, and end divider curved conduits 25 at each end. Exiting from the manifold 24 are also four straight intermediate divider conduits 26. Each of the six divided streams has a valve assembly 27 which is preferably the weir type of diaphragm valve having a TFE coated diaphragm as mentioned above. Exiting from each of the valves is an extruder conduit 36 which exits into the cut-off knife assembly 17 which will be described more fully, infra.

The revolution per minute of the augers 12 is typically 50 to 125 rpms. This is generally less than the speed of the augers when larger pieces of dough are being provided such as for loaves of bread as typically the invention herein is used for the smaller pieces of dough such as one to three ounces for rolls and buns. Of course, the size of the dough pieces and their ultimate use should not be taken as a limitation on the invention as both smaller and larger pieces can be handled.

The diameter of the inlet conduit to the manifold and the manifold header is 2 inches and the end divider curved conduits 25; straight immediate divider conduits 26 and the extruder conduits 36 are all 1¼ inches in diameter. Preferably, the conduits are made of stainless steel.

Figure 3B:
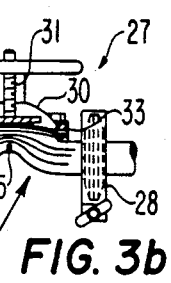

With reference to FIG. 3b, there is shown a cross section of the preferred weir type of diaphragm valves assembly 27 which forms an adjustable restrictor to fine tune the rate of flow of the continuous streams of dough after they have been divided by the manifold assembly 22. The valve assembly 27 has two connector clamps 28 which are designed for quick connect and disconnect. The valve is operated by a hand wheel 29 which has three turns or 720° from full closure to full opening. This permits fine adjustments of the throttling action of the valves. The valve also includes a bonnet 30, a screw stem 31 and a diaphragm plate 32 designed to mate with the diaphragm seat or weir 35 when the valve is fully closed. The valve has a diaphragm 33 which is coated on the inside with TFE. Other types of valving may be used to provide the throttling action provided they can be finally adjusted but the weir type of diaphragm valve is the preferred one as it provides an easy passage for the dough through the valve with minimum turbulence, is readily sanitized and can be relatively easily adjusted.

If dough was absolutely constant, it could be theoretically divided into the multiple streams having equal velocities without the need for the valving just by designing the manifold assembly with the special characteristics needed. However, this does not work out as dough such as used in the production of buns and rolls is compressible pursuant to the action of yeast. The many various forms and consistencies of dough used in the production of buns and rolls relative to absorption and ingredients that serve to give the product unique flavors and textures, etc., along with the variable velocities required for differently weighted dough pieces, make the design of a perfect manifold impractical.

Dough, being a flowable paste material, does not occupy a place on available viscosity charts. This further complicates the design of a manifold that would present the flow divider with uniform pressures and velocities to the cut-off assembly for separation into smaller volumes.

The principle separation of the dough into multiple streams is provided by the manifold assembly but it is essential that each of these streams also be fine tuned as to constant velocity of the dough by means of the throttling valves.

With reference to FIGS. 3a and 3b, each of the extruder conduits exit into an extruder plastic termination section or extruder block 37 located in the cut-off knife assembly 17. The extruder plastic termination section has an extruder nozzle with an outlet rim in a common plane on the face 58 of the plastic termination secton as best seen in FIG. 6.

Figure 5:
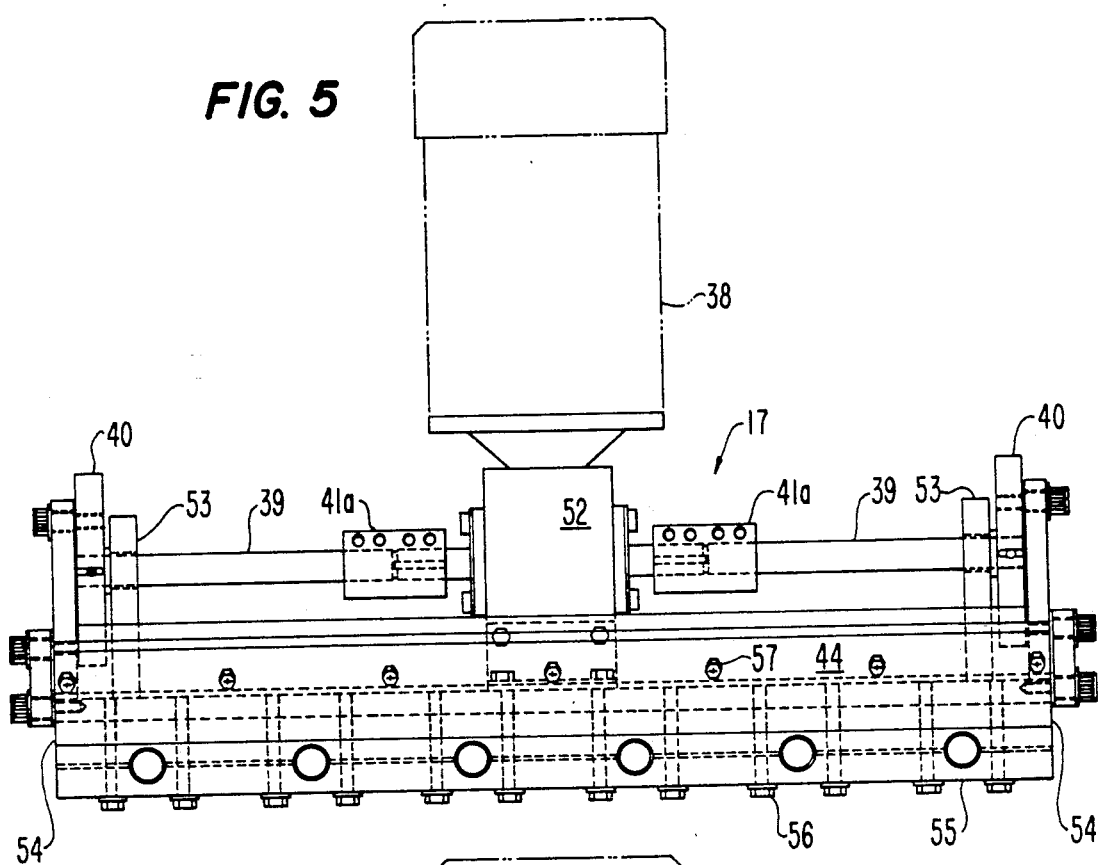
FIG. 5 is a front elevational view of the cutter and drive mechanism.
Figure 6:
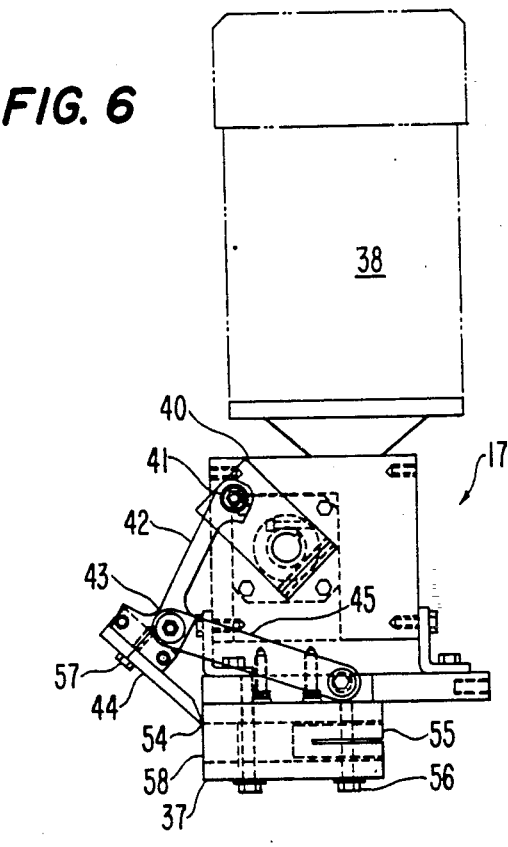
FIG. 6 is a side view of FIG. 5.

With reference to FIGS. 3a, 5 and 6, there is shown the cut-off knife assembly where a knife drive motor 38 drives a knife gear box 52 which has a double output shaft. Each output shaft is coupled by coupler 41a to the knife drive shaft 39. The knife drive shaft 39 rotates at a constant predetermined speed and drives knife drive link 40 keyed thereto. Drive link 40 has a drive link pivot 41 at the end remote from said shaft end. Carried by the drive link pivot 41 is a knife carrying or driven link 42. At the end of the driven link 42 is a second pivot 43 and beyond that pivot and adjacent thereto is mounted the cut-off knife 44 which is attached to the driven link 43 by bolts 57. The cut-off knife has a cutting edge 54.

A third link 45 is pivoted to the second pivot 43 at one end and to a fixed pivot 46 at the other end. The center of the shaft 39 and the third link fixed pivot 46 are fixedly located on the cut-off knife assembly so that the assembly itself provides a fixed link between these two pivot points so that it may be referred to as a four-bar link mechanism.

The cut-off knife assembly has a protective cover 47 which is shown in the down and safe position in FIG. 3a but is omitted for purposes of clarity in FIGS. 5 and 6. The outboard end of drive shaft 39 is supported by carrying bearings 53.

As best seen in FIG. 6, the extruder plastic termination section 37 is held to the cut-off blade assembly 17 by bolts 56. The plastic termination section has a face 58 lying in a common plane with the six extruder nozzles. As best seen in FIG. 5, the cut-off blade 44 is ⅜th inches thick, 4 inches high and 27 inches wide so that all six extrusions are cut-off simultaneously by the single blade. While the blade 44 and the plastic termination section 37 can be made of other materials, preferably they are made of ultra-high molecular density plastic or UHMD polyethylene. This does not require lubrication after long time runs and there is little or no dough build up.

Also shown in FIG. 6, is the tube and shoulder 55 of the termination of the extruder conduit 36.

The cut-off knife makes approximately 100 cuts per minute which can be readily varied up to 150 cuts per minute and reduced to fewer cuts per minute. At 150 cuts per minute, 900 dough pieces per minute are produced.

Figure 4A:
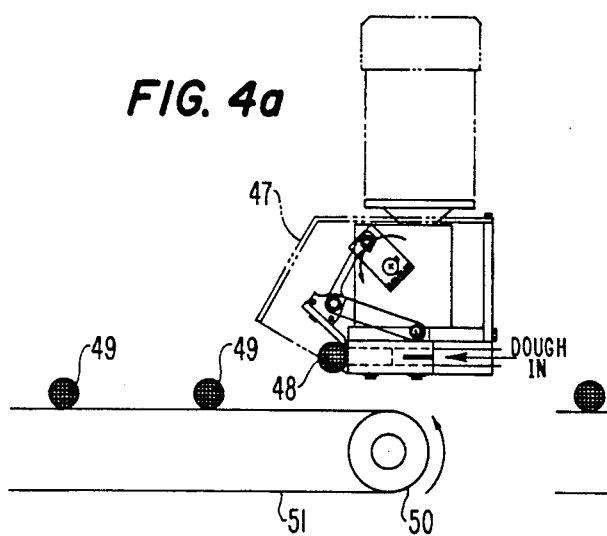
FIGS. 4a, 4b, 4c and 4d are schematics showing the progressive action of the cut-off knife.

With references to FIGS. 4a-4d, there is shown the sequence of cutting actions of the cut-off blade assembly. The shaft 39 rotates at a constant predetermined velocity in a counterclockwise direction carrying with it the drive link, driven link and third link. The unique multiple functions of the four-bar link mechanism to which the cut-off knife is attached dictates its motion and path. FIG. 4a shows a straight line motion of the knife for about 55° of rotation of the driver link as it cuts off the extruded dough piece 48. Previously cut off dough pieces 49 are shown on the conveyor belt 51 which is supported in position by the conveyor roller 50. It should be noted that the freshly extruded dough piece 48 just prior to being cut-off is of a larger diameter than the conduit from which it is extruded. This relates to the characteristic flow of dough and the fact that the dough includes gases therein which were under pressure just prior to the extrusion. The knife velocity at the point shown in FIG. 4a is close to the velocity of the driver link where it joins the driven link.

Figure 4B:
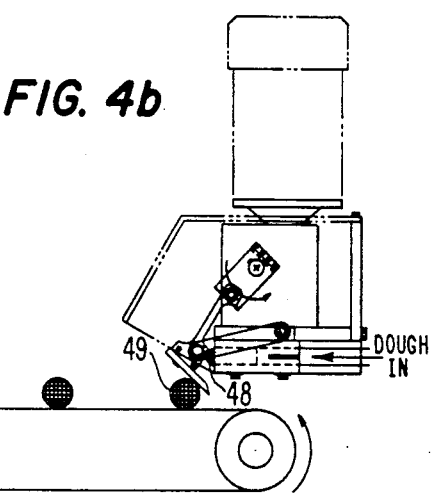

With reference to FIG. 4b, there is shown how the cut-off knife controls the movement of the product. As the dough pieces are cut-off and deposited on the conveyor belt, they are accelerated by the motion of the knife in the direction of the conveyor belt travel.

Figure 4C:
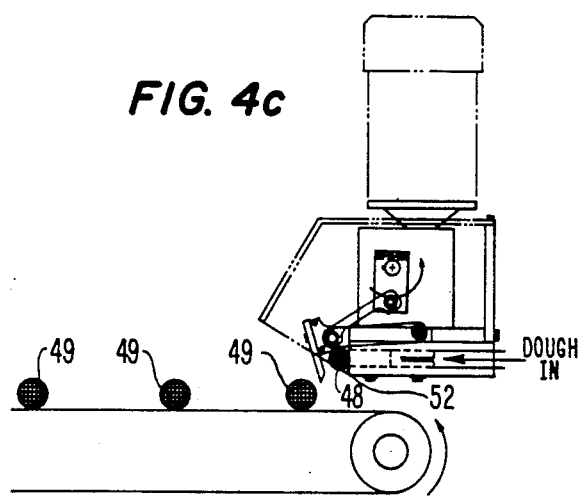

With reference to FIG. 4c, there is a velocity change as the knife first accelerates outward and upward, urging the current dough piece in the direction of the conveyor belt travel, then decelerates to the top of the knife's path completely clearing the extrusion port to make clearance for the subsequent dough piece being extruded. The increase in dwell across the top of the knife path allows for the extrusion of larger pieces of dough to be made without interfering with the knife at this stage of the cycle.

Figure 4D:
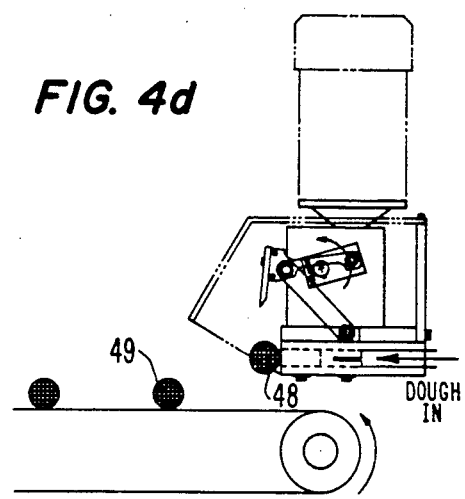

With reference to FIG. 4d, there is a further depiction of the path change as the knife starts downward, accelerating to the point of straight line motion as it engages the cutting plane of the dough piece just above the discharge port.

The uniform spacing of the dough pieces along the conveyor belt should be noted as previously such spacing was not normally attained. The present invention permits a much better control of the manufacturing process downstream from the apparatus.

There has thus been described a unique apparatus and method for simultaneously providing multiple dough pieces having a uniform texture and weight, free from lubricating oil and uniformly placed on a conveyor belt. There is also described a unique cutting arrangement and method and dough and the like divided and method.

It will be understood that the foregoing relates only to one preferred embodiment of the present invention. Numerous changes and modifications may be made therein without departing from the spirit and scope of the invention set forth in the following claims.

What is claimed is:

1. Apparatus for dividing a mass of dough-like material into pieces of uniform weight comprising:
    an extruder nozzle having an outlet rim in a common plane for continuously dispensing a flow of dough-like material of uniform density under pressure;
    a cut-off knife assembly including a rotary cut-off knife positioned to make a straight line cut across said outlet rim to cut dough-like material extruded from said extruder nozzle;
    said cut-off assembly including:
        a driven shaft rotating about a fixed axis;
        a drive link having one end fixed to said shaft to rotate therewith and having a drive link pivot at the other end;
        a knife carrying link pivoted at one end to said drive link pivot and carrying said cut-off knife at the other end with a second pivot adjacent said cut-off knife;
        a third link pivoted at one end to said knife carrying link second pivot and pivoted at the opposite end to a fixed pivot spaced from said shaft axis; and
        said drive link, said knife carrying link, said third link and said spacing between said fixed pivot and said shaft axis having relative dimensions which define a pivoting link mechanism that causes said cut-off knife to move in a path that includes a straight line across said outlet rim to cut-off said extruded dough-like material then accelerates away from and crosses in front of said rim to an upward position where it decelerates to the top of the cut-off knife's path in a manner that sufficient clearance is provided for the subsequent dough-like material piece to be extruded before making the next cut.

2. Apparatus of claim 1, wherein said relative dimensions of the components of said pivoting link mechanism causes said cut-off knife to additionally move in a manner to cause the dough-like material pieces to be accelerated in a desired direction.

3. The apparatus of claim 1 which further includes a conveyor belt located beneath said cut-off assembly and said pivoting link mechanism causes said cut-off knife to additionally control the movement of said cut-off piece of extruded dough-like material to accelerate it in the direction of the conveyor belt travel.

4. The apparatus of claim 1, wherein said rotary cut-off knife is made of plastic and said apparatus further includes an extruder plastic termination section with said extruder nozzle being contained in said termination section whereby the cutting operation of the plastic knife passing over said outlet rim cuts said dough-like material to be cut in a manner that there is minimum dough-like material build up on said cut-off knife and said extruder nozzle.

5. The apparatus of claim 4, wherein said extruder plastic termination section contains a plurality of extruder nozzles which extrude dough-like material at identical rates and the said cut-off knife is a single knife that bridges all of the extruder nozzles to simultaneously cut-off identical pieces of dough-like material.

6. The apparatus of claim 2, wherein the relative dimensions of the components of said pivoting link mechanism additionally causes said cut-off knife to move in a manner that there is an increase in dwell at the top of the knife path which allows for the extrusion of larger pieces of dough-like material to be made without interfering with said cut-off knife.

7. Apparatus for dividing a mass of dough-like material simultaneously into a plurality of smaller volumes of uniform weight comprising:
    a conduit for dispensing a flow of dough-like material of uniform density under pressure;
    a manifold assembly having an inlet connected to said conduit and a plurality of divider conduits for dividing said flow of dough-like material into a plurality of equally divided smaller flows of dough-like material;
    adjustable throttling weir type diaphragm valves connected to each of said divider conduits for minor adjustment of each of said smaller flows so all will flow at the same rate;
    an outlet for each of said throttling valves;
    a plurality of extruder conduits each connected at one end to said valve outlets and having at the other end an extruder opening for extruding the dough-like material; and
    a cut-off assembly arranged to cut-off simultaneously the dough-like material being extruded from each of said extruder conduits into a plurality of pieces of uniform weight.

8. The apparatus of claim 7, wherein said diaphragm valves have a surface adjacent the dough of polytetrafluoroethylene.

9. Apparatus for dividing a mass of dough-like material simultaneously into a plurality of smaller volumes of uniform weight comprising:

a conduit for dispensing a flow of dough-like material of uniform density under pressure;

a manifold assembly having an inlet connected to said conduit and a plurality of divider conduits for dividing said flow of dough-like material into a plurality of equally divided smaller flows of dough-like material;

adjustable throttling valves connected to each of said divider conduits for minor adjustment of each of said smaller flows so all will flow at the same rate;

a valve outlet for each of said throttling valves;

a plurality of extruder conduits each connected at one end to said valve outlets and having at the other end an outlet rim and extruder opening for extruding the dough-like material;

a cut-off knife assembly including a rotary cut-off knife arranged to cut-off simultaneously the dough-like material being extruder from each of said extruder conduits into a plurality of pieces of uniform weight by making a straight line cut across said outlet rim;

said cut-off knife assembly including:

a driven shaft rotating about a fixed axis;

a drive link having one end fixed to said shaft to rotate therewith and having a drive link pivot at the other end;

a knife carrying link pivoted at one end to said drive link pivot and carrying said cut-off knife at the other end with a second pivot adjacent said cut-off knife;

a third link pivoted at one end to said knife carrying link second pivot and pivoted at the opposite end to a fixed pivot spaced from said shaft axis; and said drive link, said knife carrying link, said third link and said spacing between said fixed pivot and said shaft axis having relative dimensions which define a pivoting link mechanism that causes said cut-off knife to move in a straight line across said outlet rim to cut-off said extruded dough-like material then accelerates away from and crosses in front of said rim to an upward position where it decelerates to the top of said cut-off knife's path in a manner that sufficient clearance is provided for the subsequent dough-like material piece to be extruded before making the next cut.

* * * * *

UNITED STATES PATENT AND TRADEMARK OFFICE
CERTIFICATE OF CORRECTION

PATENT NO. : 5,046,940
DATED      : September 10, 1991
INVENTOR(S) : Donald L. Cummins It is certified that error appears in the above-identified patent and that said Letters Patent is hereby corrected as shown below:

TITLE - IN THE HEADING, under [19], "Cummings" should be --Cummins--; and

TITLE PAGE [75], "Cummings" should be --Cummins--.

Signed and Sealed this

Sixteenth Day of March, 1993

*Attest:*

STEPHEN G. KUNIN

*Attesting Officer*     Acting Commissioner of Patents and Trademarks